Oct. 21, 1930.　　　C. G. OLSON　　　1,778,769
RELIEVING MACHINE
Filed March 14, 1928　　9 Sheets-Sheet 1

INVENTOR
CARL G. OLSON
By Cheever & Cox
ATTYS

Oct. 21, 1930.   C. G. OLSON   1,778,769
RELIEVING MACHINE
Filed March 14, 1928   9 Sheets-Sheet 4

INVENTOR
CARL G. OLSON
By Cheever & Cox
ATTYS

Oct. 21, 1930.  C. G. OLSON  1,778,769
RELIEVING MACHINE
Filed March 14, 1928    9 Sheets-Sheet 5
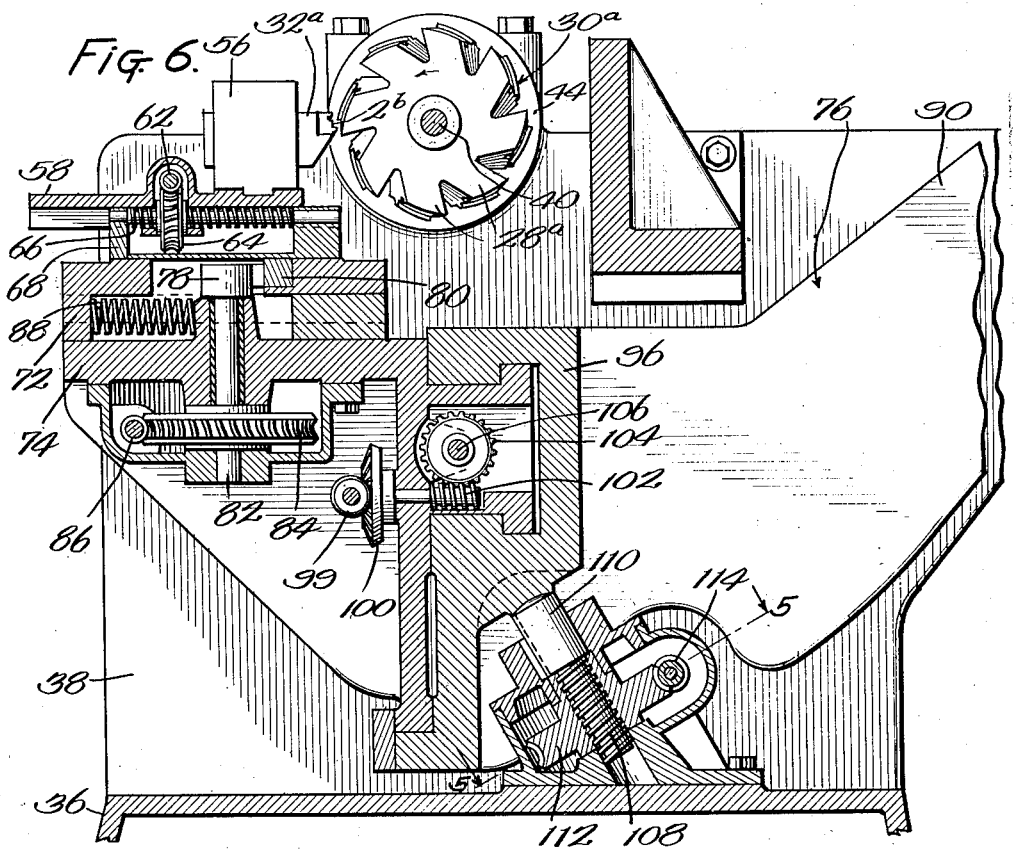
INVENTOR
CARL G. OLSON
BY Chewer + Ock ATTYS.

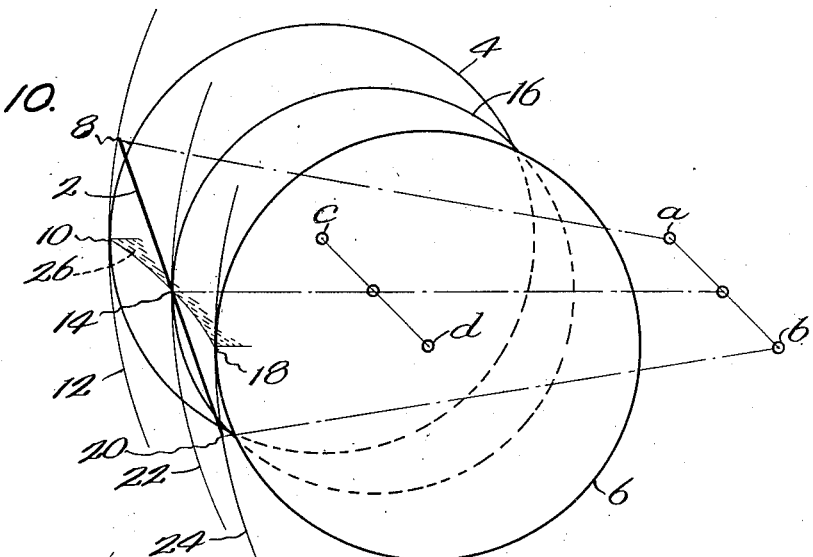
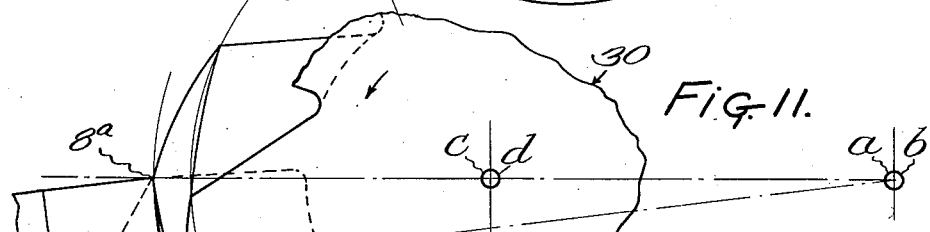
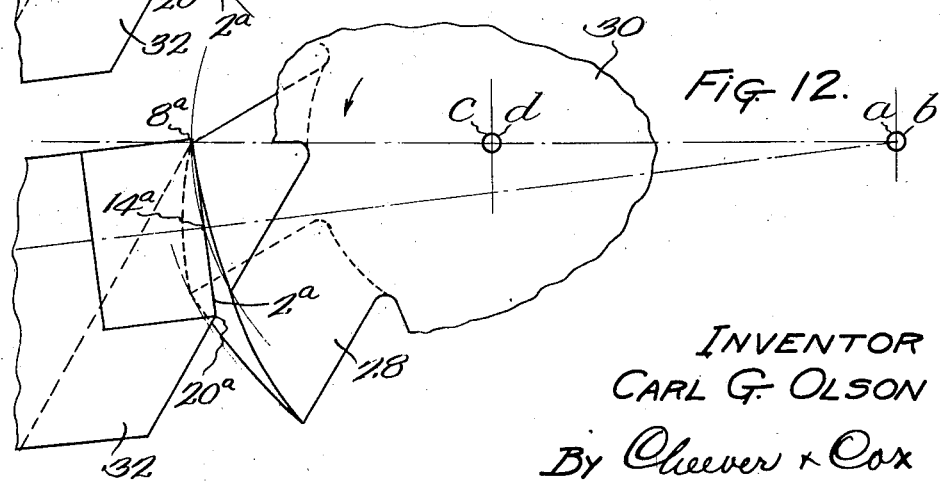

Oct. 21, 1930. C. G. OLSON 1,778,769
RELIEVING MACHINE
Filed March 14, 1928 9 Sheets-Sheet 9
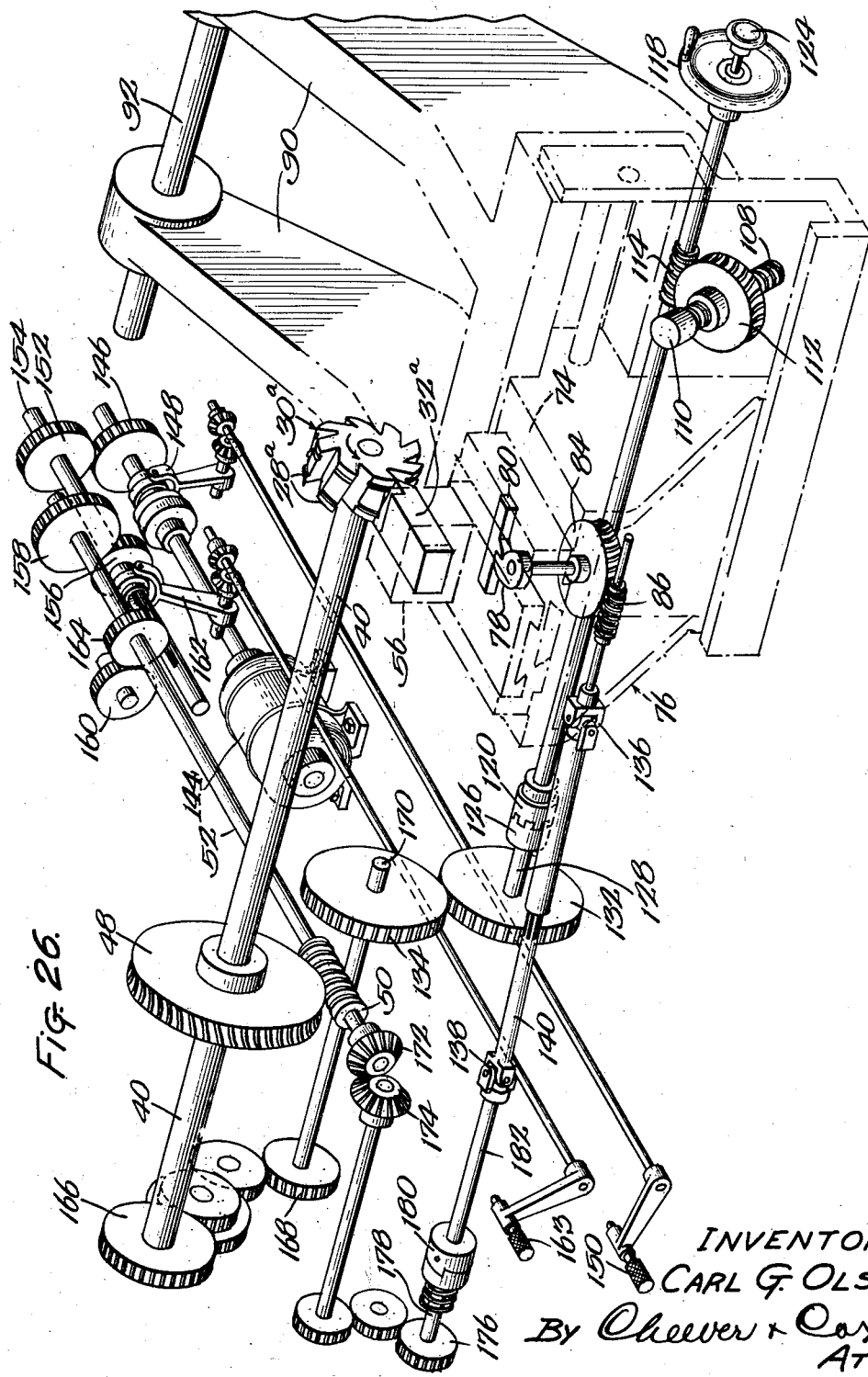
INVENTOR
CARL G. OLSON
By Cheever & Cox
ATTYS.

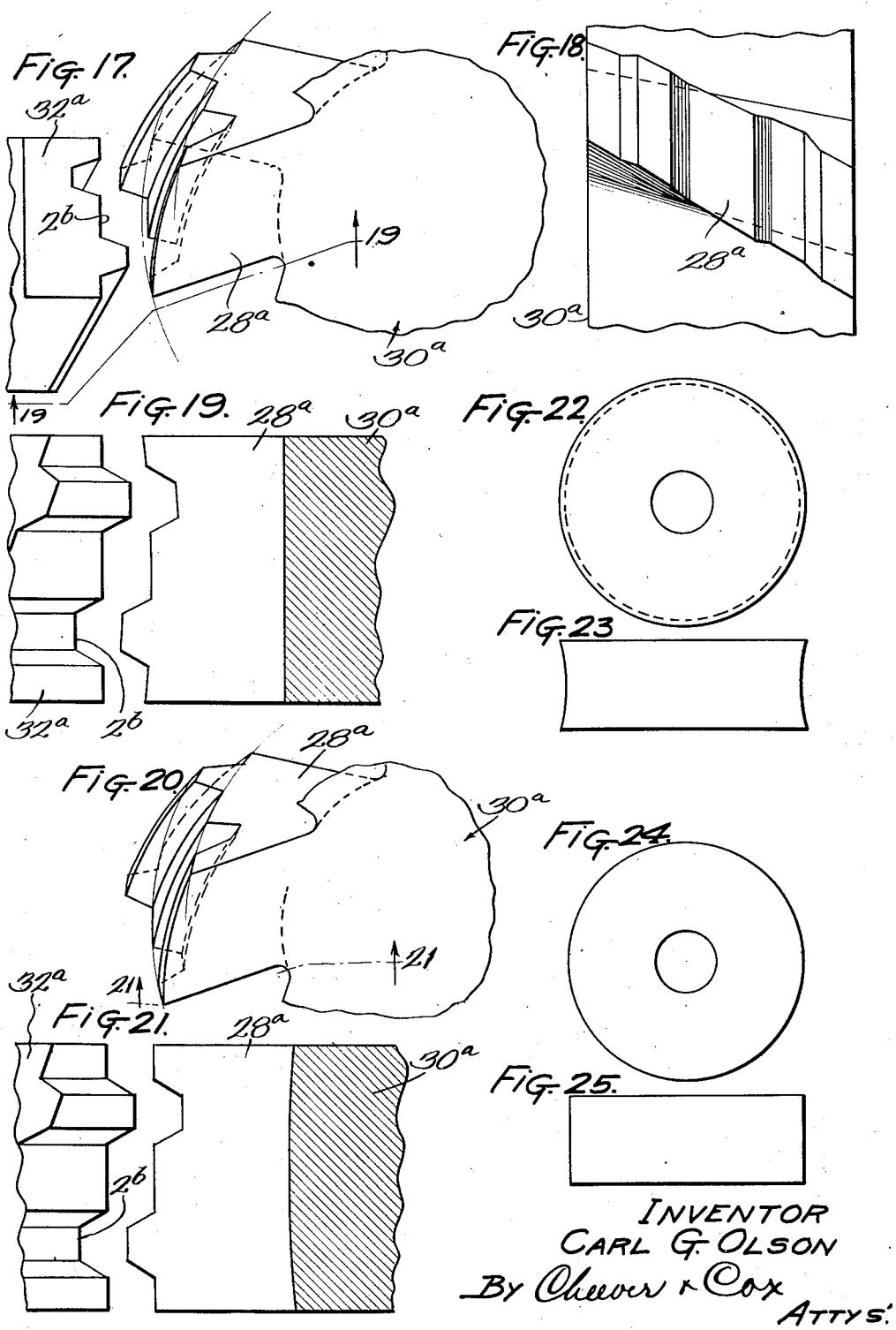

Patented Oct. 21, 1930

1,778,769

UNITED STATES PATENT OFFICE

CARL G. OLSON, OF CHICAGO, ILLINOIS, ASSIGNOR TO ILLINOIS TOOL WORKS, OF CHICAGO, ILLINOIS, A CORPORATION OF ILLINOIS

RELIEVING MACHINE

Application filed March 14, 1928. Serial No. 261,484.

This invention relates to apparatus for producing rotary cutters, and particularly to apparatus for relieving teeth of milling cutters and the like, which will have an aggregate curve in the cutter profile to allow for shrinkage and distortion resulting from the tempering process occurring after the cutter is made.

As set forth in my co-pending application relating to methods of producing cutters, Serial No. 211,725, filed Aug. 9, 1927, it is well known by those skilled in the art of hardening steel that a heated object, such as a milling cutter, when quenched in a cooling bath, will experience certain distortions. Thus it has been found in certain instances that when a heated milling cutter having a cylindrical body is quenched in a cooling bath, the ends thereof cool before the central portion, and the contraction of the ends in cooling will force the central portion outwardly so as to present a barrel-shaped cutter body instead of the desired original cylindrically shaped body.

In general, my present invention contemplates the provision of a durably constructed and efficiently operable apparatus whereby the method of making cutters and the like, as set forth in my above mentioned co-pending application, may be expeditiously practiced thereby enabling the production of cutters, which, after having been tempered, will have a proper cylindrical form.

More specifically, an object of my invention is to provide an efficiently operable machine for making the cylindrical body of a cutter concave or hour-glass shaped to an extent that will just compensate for the contraction of the ends and the bulging of the body portion thereof when said cutter is heated and subjected to a quenching bath.

A further object of my invention is to provide a machine which is designed to properly form and relieve milling cutters having helical flutes or gashes extending longitudinally of the cutter, said machine functioning to produce an aggregate curve in the cutter profile differing from the aggregate form of the profile of the finished cutter so that when the cutter is subsequently heated and treated in a quenching bath the distortions which the cutter may experience will be compensated for by reason of the stock removed during the forming and relieving of the cutter.

A further object of my invention is to provide a machine for producing cutters in which a cutter blank may be rotated, and a cutting tool for forming the cutter blank is provided, together with means for reciprocating said tool in timed relation to the rotation of the cutter blank, for relieving the teeth, said machine being further provided with means whereby the tool is caused to move along an orbit tangential to the cutter blank so as to envelope said blank, thereby introducing an aggregate curve in the cutter profile in accordance with the teachings of the method of producing cutters as set forth in my above mentioned co-pending application.

A still further object of my present invention is to produce a machine of the nature set forth above, which is designed to present a tool to a rotating cutter blank with the cutting edge of the tool askew to the work axis, and to move the tool tangentially of the cutter blank in an arcuate path whereby each of the cutter teeth will be uniformly relieved and the aggregate cutting profile of the blank properly curved, as above set forth, the tool employed in this instance having a cutting profile which is identical with the required profile of the cutter, that is the profile which the cutter is required to present after it has been subjected to a hardening process.

With the foregoing and other objects in view, which will appear in the following description, the invention resides in the novel combination and arrangement of parts and of the details of construction hereinafter described and claimed in connection with the accompanying drawings wherein:

Figure 6 is a vertical sectional view taken transversely of the machine as viewed along the line 6—6 of Figure 1.

Figure 7 is an end view of a cutter of the type which may be produced by the use of my improved machine, and it is to be noted that this cutter has relieved teeth and helical flutes, and that these teeth are so formed that they may be sharpened without changing their cutter profiles.

Figure 8 is a face view of the cutter shown in Figure 7.

Figure 9 is a perspective view of the cutting end of a tool which will produce the type of work shown in Figures 7 and 8.

Figure 1:
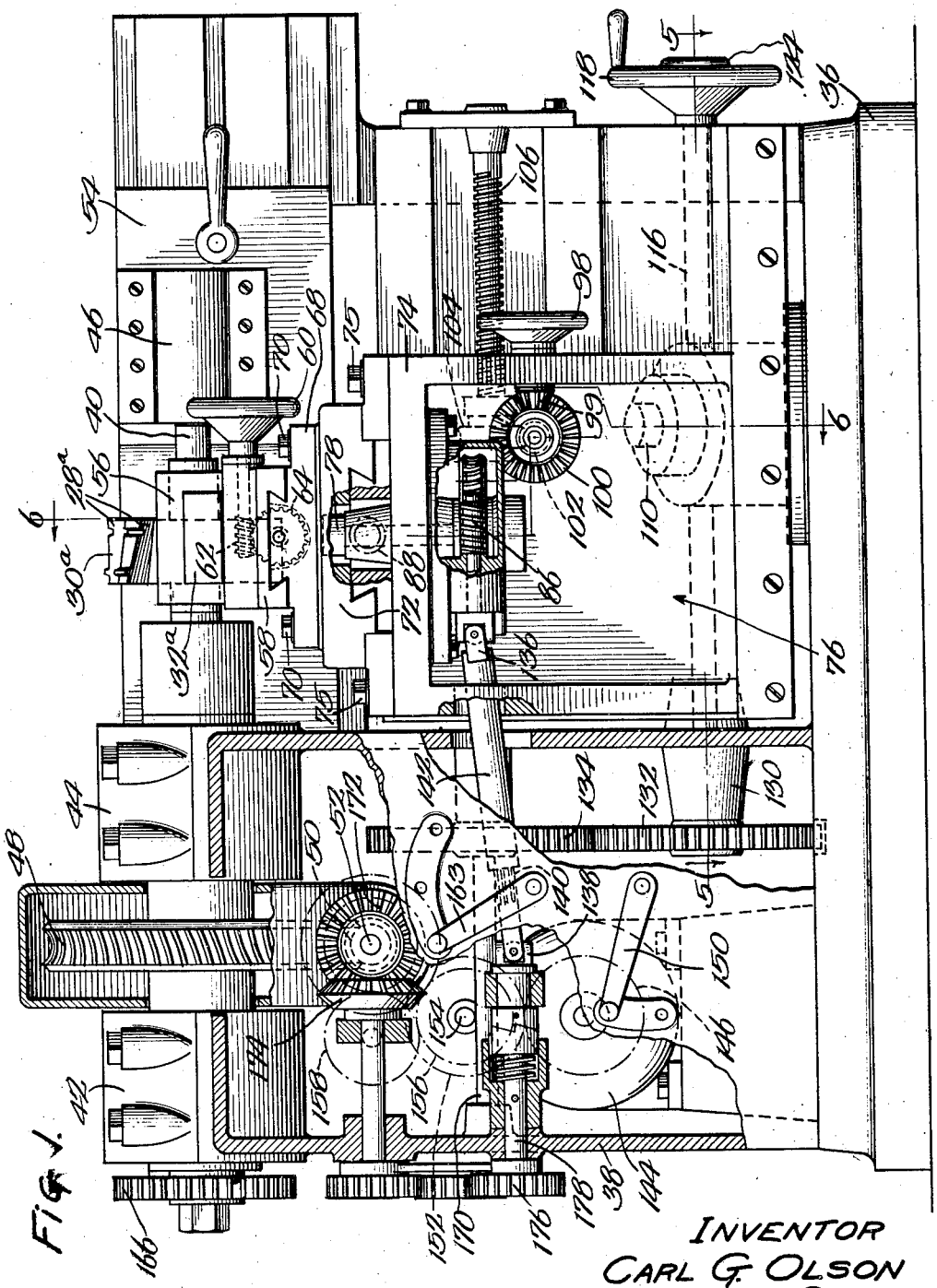
Figure 1 is a front elevational view of a forming and relieving machine which is representative of one embodiment of my invention, a portion of the frame structure thereof being broken away to more clearly illustrate the functional characteristics of certain of the cooperating parts.

Figure 10 is a diagrammatic view in perspective showing the principal involved in the arrangement of a machine produced in accordance with the teachings of my invention, in which a straight line generatrix is placed askew with respect to the axis of the work and is caused to swing on an arc which is centered on an axis parallel to the work axis and at a distance therefrom on the side opposite to the generatrix.

Figures 11 to 16 inclusive are diagrammatic views showing a tool having a straight cutting profile in different positions, which said tool will occupy in the course of forming and relieving a cutter blank. It is to be understood that in practice a formed tool such as the tool disclosed in Figure 9 is ordinarily employed instead of a tool having a straight line cutting edge, but a straight line tool is shown in these diagrams merely for simplification and to facilitate an understanding of the principal upon which my invention proceeds.

Figure 17 is an end view (i. e. an axial view) of a formed tool similar to the tool disclosed in Figure 9 in association with a fragmentary portion of a cutter blank, this view being analogous to the diagram in Figure 11, except for the fact that in Figure 11 a straight line tool is shown and said tool is also disclosed in operative association with the tooth surface. The cutter tooth and the tool are separated in Figure 11 in order that both may be more clearly seen.

Figure 18 is a face view of the work or cutter tooth disclosed in Figure 17.

Figure 19 is a bottom view shown partly in section of the tool and the work as viewed along the line 19—19 of Figure 17. The profile of the cutter view has been projected on a diametral plane in order to show the concave shape of the work prior to tempering.

Figure 20 is a similar to Figure 17 except that it shows the work after it has been hardened.

Figure 21 is the same as Figure 19 except that it shows the work after it has been hardened.

Figures 22 and 23 are end and side elevational views of a cylindrical body which is hour-glass shaped. The hour-glass shape disclosed in these figures corresponds to the peripheral contour of a cutter blank after it has been subjected to the cutting action of a tool in accordance with the teachings of my invention.

Figures 24 and 25 are views similar to those shown in Figures 22 and 23 after the hour-glass shaped body has been subjected to a tempering treatment, and, Figure 26 is a perspective view of certain cooperating elements of the machine disclosed in Figures 1 to 4 inclusive, to clearly illustrate the agencies through which the cutter is rotated, the tool is reciprocated and the swinging frame actuated.

In order to facilitate the understanding of my improved forming and relieving machine, I propose to first set forth some of the underlying principles upon which my invention is based in a manner somewhat similar, although not in such great detail, as the description set forth in my aforementioned co-pending application which relates to a method of producing rotary cutters. In this co-pending application I have described in detail how an hour-glass shaped body or in other words a hyperboloid of revolution results when a straight line generatrix is caused to pass around two parallel circles as directrices, the generatrix being askew to the axis of the two circles. Thus, referring to Figure 10 of the drawings, it will be observed that I disclose a diagrammatic view in perspective which is similar to Figure 6 of my co-pending application in which a straight line generatrix 2 is shown which in practice swings through an arc centered along an axis $a$—$b$. This axis $a$—$b$ corresponds to the axis of a swinging frame later to be described and an axis $c$—$d$ corresponds to the axis of a supported cutter which will hereinafter be described, but for purposes of illustration I have indicated said cutter as included within the hyperboloid of revolution which is bounded on one end by a circle 4 and on the other end by a circle 6. In the ordinary hyperboloid of revolution the generatrix may be considered as revolving in a circular orbit whose axis is coincident with the axis of the rotation of the work, as for example, the axis $c$—$d$.

My improved machine, however, is designed so that the axis of the orbit of a forming tool is not coincident with the axis of rotation of the work but said orbit is determined by the arcuate movement of the tool about an axis such as $a$—$b$ which is parallel to the axis $c$—$d$ but not coincident therewith. In other words, the radius of rotation or arcuate movement of a tool which moves about the center line $a$—$b$ will be greater than the radius of the work. It is also to be understood that the generatrix or line 2 represents simply the general contour of the cutting edge of a tool to be employed, although in practice said cutting edge is formed or configurated instead of being straight as will hereinafter be explained.

Assume now that the generatrix 2 is a straight cutting edge of a tool, which edge is positioned askew to the axis $c$—$d$, about which the work rotates, and assume also that the cutting edge or generatrix 2 is moved upwardly about the axis $a$—$b$. The upper end 8 of the line 2 will first engage the work (disregarding the thickness of the cut) at the point 10 which is at one end of the work and at the zone of largest diameter. This end 8 will move upwardly along an arcuate path as indicated by the line 12, and after the line or cutting edge 2 has risen half way up through the acting zone its middle point 14 will engage the middle zone of the work along a circle indicated by the numeral 16. As the generatrix or cutting edge 2 continues to rise, it will finally reach a point 18 located upon the circle 6. In other words, during one complete upward movement the generatrix will have traversed the entire curved surface of the work and consequently will have completed it and produced the hyperboloid of revolution as illustrated in Figure 10. Thus it will be understood that the generatrix 2 initially engages the work at the point 10 and successive portions of the generatrix progressively engage the peripheral surface of the cutter or object bounded by the circles 4 and 6 until finally the extremity 20 of the generatrix is moved into engagement with the surface of the work at the point 18. As the generatrix moves about the center line $a$—$b$, the end 8 follows the arcuate path 12, the middle portion follows the arcuate path 22 and the opposite end 20 moves in the path 24. It will be noted that I have disclosed a diametral section of the hyperboloid of revolution disclosed in Figure 10, said diametral section being shown by a shaded area 26.

Figure 13:
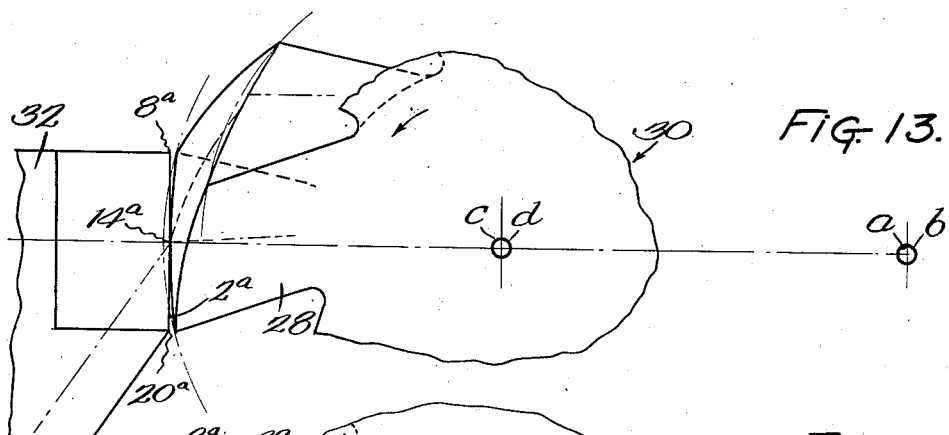
Figure 14:
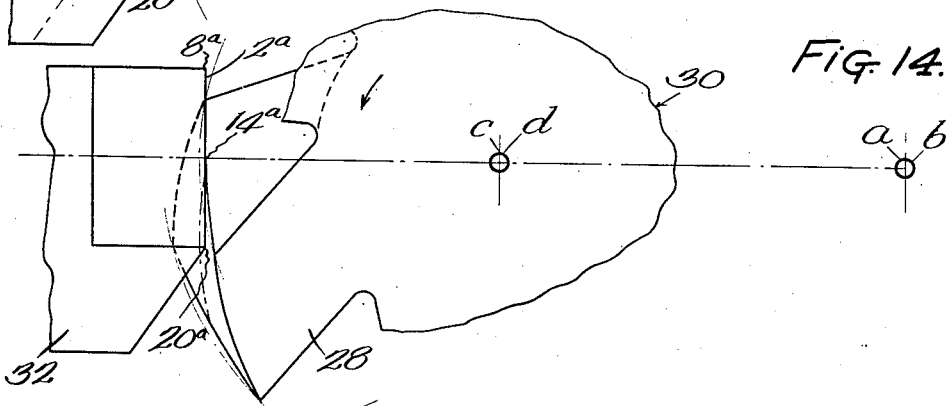
Figure 15:
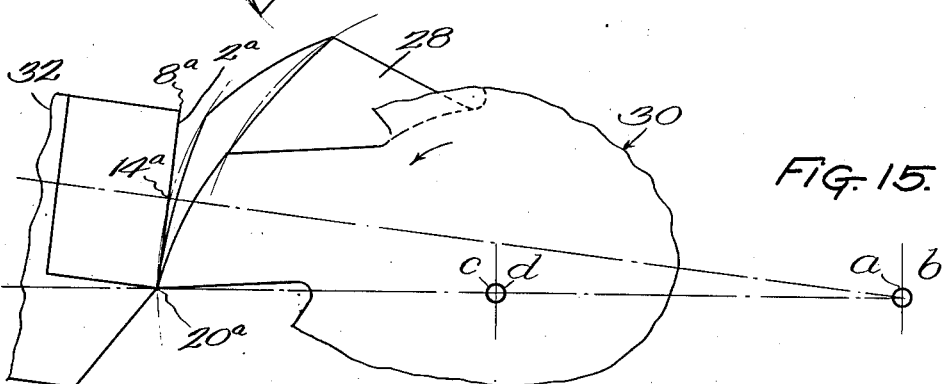
Figure 16:
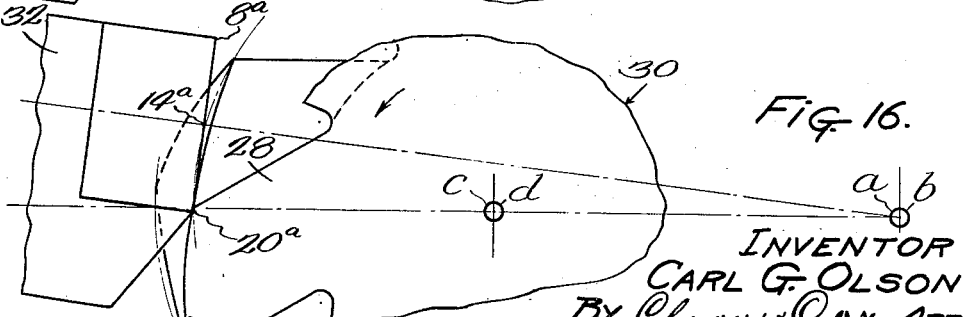

A practical application of the principle set forth in connection with the diagrammatic representations in Figure 10 will now be described in connection with Figures 11 to 16 inclusive. In these figures I have disclosed a single tooth 28 of a milling cutter indicated generally by the numeral 30, and for purposes of simplification in description I have shown the tooth 28 as having a straight line cutting edge as distinguished from the ordinary type of formed milling cutter teeth disclosed in Figures 7 and 8. The axis of revolution of the cutter 30 corresponds to the center line $c$—$d$ which is the axis of revolution of the hyperboloid of revolution disclosed in Figure 10 and the peripheral surface of the cutter tooth 28 corresponds to the peripheral surface of said hyperboloid of revolution. A cutting tool 32 is disclosed in association with the tooth 28 which is provided with a straight line cutting edge $2^a$ which corresponds in functional characteristics to the generatrix 2 of Figure 10. The cutting edge $2^a$ of the tool 32 is positioned askew to the axis $c$—$d$ of the cutter 30 similarly to the manner in which the generatrix 2 of Figure 10 is positioned askew with respect to the axis $c$—$d$, and said tool should be considered as movable in an arcuate path about an axis $a$—$b$ which simulates the axis $a$—$b$ of Figure 10. It must also be borne in mind that this tool, in order to relieve the peripheral surface of the tooth 28 must be moved transversely of the cutter 30. The means for imparting these transverse and arcuate movements to said tool will be hereinafter clearly described in connection with my improved apparatus by means of which it is capable of forming and relieving cutter teeth in a manner which is based upon the principles I am now endeavoring to set forth in connection with Figures 11 to 16 inclusive. As the tool 32 moves upwardly about the axis $a$—$b$ and the cutter 30 is rotated as indicated by the directional arrow, the uppermost portion of the cutting edge $2^a$, which I have indicated by the numeral $8^a$, will be moved into operative association with an edge portion of the periphery of the tooth 28. It is to be understood that the upward arcuate movement of the tool 32 is very slow in comparison to the revolutional speed of the cutter 30 and after the tooth 28 has been moved past the portion $8^a$ of the cutting edge $2^a$, said edge portion $8^a$ will then be moved into a position by suitable backing-off means later to be described, so that the next following tooth of the cutter will be carried into association with the tool in a manner similar to the manner just described in connection with the association of the tooth 28 with the cutting edge of the tool. In Figures 11 and 12 I have disclosed the start and finish respectively of the first cut made by the tool 32, and referring to Figures 13 and 14, it will be observed that the tool 32 is shown as having been elevated so that a center portion $14^a$ of the cutting edge $2^a$ is in operative association with the central area or zone of the periphery of the tooth 28. Figure 13 discloses the beginning of said middle cut made by the tool, and Figure 14 discloses the completion of said cut. In Figure 15 the tool 32 has been swung in an arcuate path about the axis $a$—$b$ to the position where a portion $20^a$ of the cutting edge $2^a$ is about to make the final cut along the tooth periphery and Figure 16 discloses the completion of the final cut. From the foregoing it will be clear that the functional characteristics of the cutting edge $2^a$ of the tool 32 are similar to the operating characteristics of the generatrix 2 of Figure 10. Thus as the cutting edge $2^a$ is swept across the peripheral surfaces of the teeth of the cutter 30, the depth of the cut made by the tool will be greatest at the central portion of the periphery of each tooth and hence the aggregate cutting profile of each tooth will be curved. In other words, each tooth will be formed with a concave peripheral surface, the concavity being just sufficient to compensate for the distortions to which the cutter will be subjected upon tempering as hereinbefore described. It is also to be understood that the cutter 30 is helically fluted and hence it will be necessary to compensate for this fact by slightly modifying the rate of rotation of the cutter body with respect to the speed at which the tool 32 is elevated. Thus in the particular instance the rotation of the cutter 30 must be of such a speed with respect to the backing-off or reciprocating movement imparted to the cutting tool that said cutter will lag sufficiently so as to present each tooth to the cutting tool in proper timed relation as successive portions of the cutting edge $2^a$ thereof are progressively swept across the periphery of the cutter teeth. In practice, milling cutters are often made with teeth having configurated or formed cutting profiles as distinguished from the straight cutting profile of the cutter 30, but the principle just set forth in connection with the forming and relieving of the teeth in the cutter 30 are equally applicable where cutters are to be produced having formed teeth.

Figure 2:
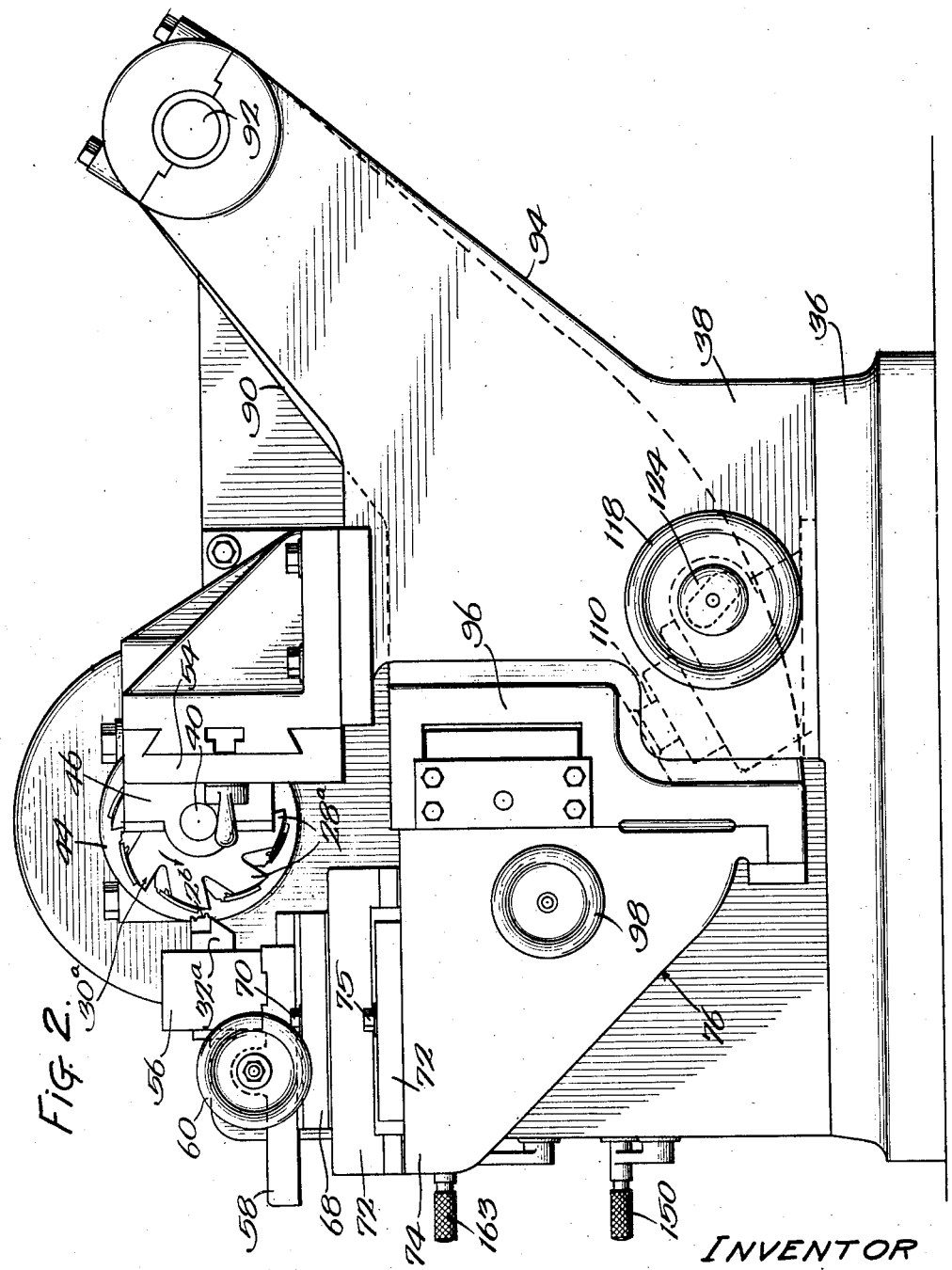
Figure 2 is an end elevational view of my improved relieving machine as viewed from the right in Figure 1.
Figure 3:
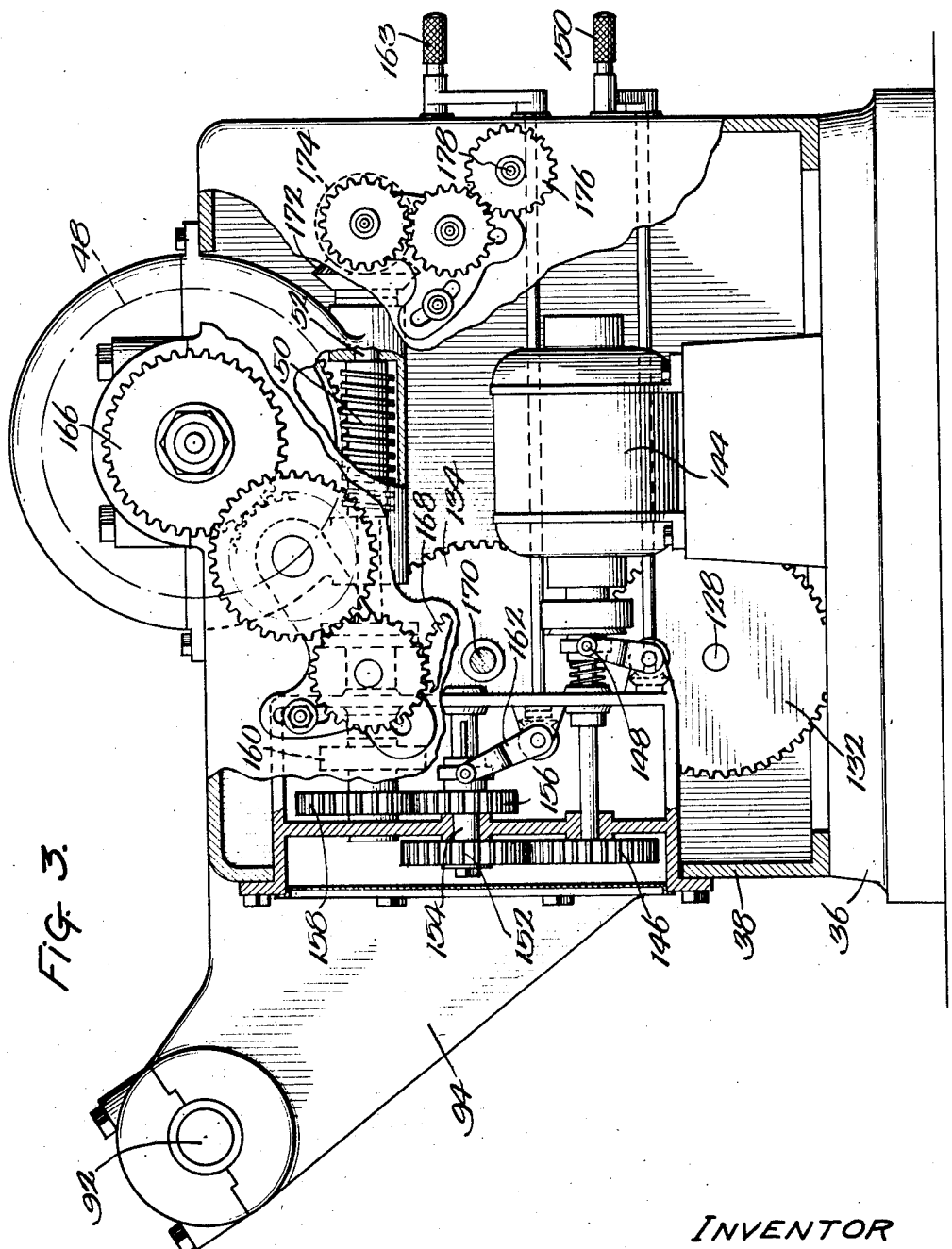
Figure 3 is also an end elevational view of the machine as viewed from the left Figure 1, a portion of the machine frame being broken away to disclose parts otherwise hidden.

With the foregoing description in mind I will now proceed to describe in detail an apparatus which is representative of a practical embodiment of features of my invention. Referring to Figures 1 to 6 inclusive, it will be observed that my invention contemplates the provision of a suitable machine bed 36 upon which is mounted a machine frame 38. A work or cutter supporting spindle 40 extends horizontally and longitudinally of the frame 38 and is mounted within suitable bearings 42 and 44 at one extremity, the other extremity of said spindle being adapted to be supported by a suitable tail-stock bearing 46. Rotation is imparted to the work support spindle 40 through the agency of a worm wheel 48, Figures 1, 3 and 26, which engages a worm 50 provided on a suitable drive shaft 52. In the drawings a milling cutter blank $30^a$ is shown supported by the spindle 40 and the tail-stock 46 which is mounted upon a horizontally slidable carriage 54, Figures 1 and 2, shown in operative association with the work spindle. The cutter blank $30^a$ is normally rotated in a direction indicated by the directional arrows in Figures 2, 6, and 26, and operatively associated with teeth $28^a$ of the cutter is a forming tool $32^a$.

This forming tool $32^a$, which is mounted in a suitable tool post 56, is provided with a formed cutting profile or edge $2^b$. It will be observed that when this tool $32^a$ is properly mounted within the tool post 56 the aggregate cutting profile or edge $2^b$ will be askew with respect to the axis of the cutter $32^a$. In this connection it will be seen that the axis of the cutter $32^a$ corresponds with the axis or center line $c$—$d$ hereinbefore referred to in connection with Figures 10 to 16 inclusive and that the tool cutting edge $2^b$ corresponds similarly to the cutting edge $2^a$ of the tool 32. The tool post 56 is supported by a slide 58 which is horizontally adjustable toward and away from the work by means of a hand wheel 60, Figures 1 and 4. This hand wheel 60 operates a worm 62, Figures 1 and 6, which engages a worm wheel 64 secured to a screw 66, and rotation of this screw 66 will result in horizontally moving the slide 58. A guide block or table 68 which supports the slide 58 and the screw 66 is adapted to be angularly positioned or rotated upon a carriage block 72, the table 68 being secured to the carriage block 72 by means of suitable tightening nuts 70. This carriage block 72 is rotatably and slidably mounted upon a support member 74 which forms a part of a swinging frame designated generally by the numeral 76, Figures 1, 2, 4 and 6. The position of the carriage block 72 upon the support member 74 is determined by suitable tightening screws 75. Thus it will be understood that the carriage block 72 and the guide block 68 may be angularly or rotatably adjusted to properly position the tool $32^a$ with respect to the work. The table 68 and the carriage block 72 may be angularly positioned as above mentioned when it is desired to cause the tool $32^a$ to side relief the teeth of a supported cutter and this will be more readily understood as the description proceeds.

Figure 4:
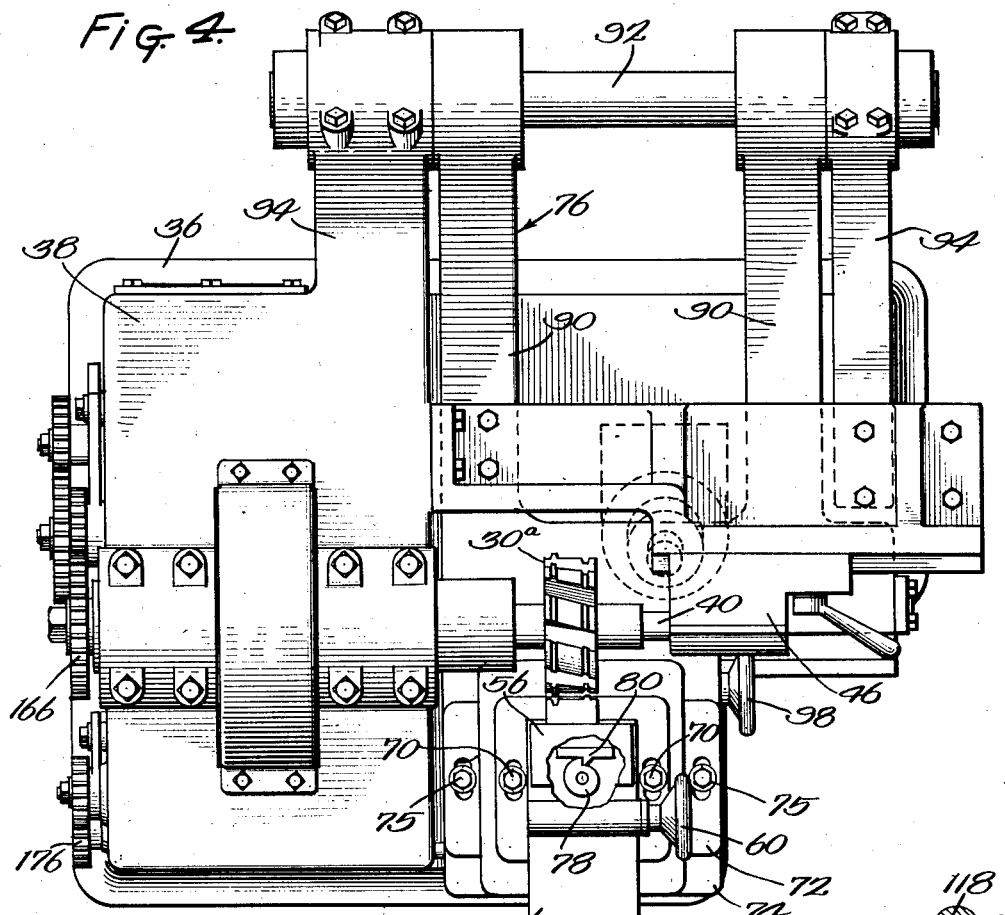
Figure 4 is a reduced plan view of the relieving machine, a portion of the tool supporting device being broken away to more clearly disclose the tool reciprocating cam.
Figure 5:
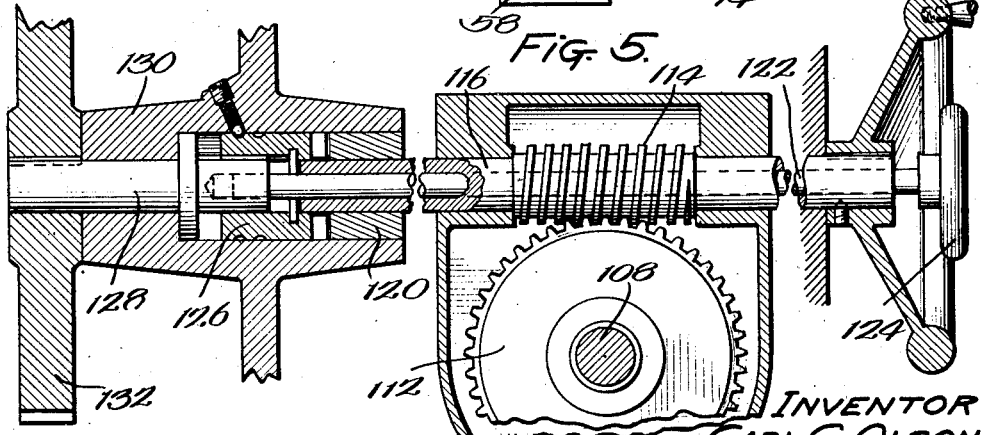
Figure 5 is a fragmentary detail sectional view of the means for actuating the swinging frame, said section being taken on the line 5—5 of Figure 6.

To impart a backing-off or reciprocating movement to the tool $32^a$ I provide a cam 78 which engages a cam block 80, Figures 4 and 6, carried by the carriage block 72. The cam 78 is mounted at the upper extremity of a vertical shaft 82, the lower end of which supports a worm wheel 84 which engages a worm 86. Upon each revolution of the worm wheel 84 the cam 78 will cause a complete reciprocation of the carriage block 72 and hence the tool $32^a$, and in order to maintain contact between the cam block 80 and the surface of the cam 78 a coiled spring 88 is interposed between a depending portion of the carriage block 72, Figure 6, and a boss extending upwardly from the support member 74. As hereinbefore mentioned, when it is desired to side relief cutter teeth it is only necessary to angularly adjust the table 68 and the carriage block 72, in which instance the backing-off cam 78 will operate to feed the cutting tool angularly with respect to the work.

This support member 74 is carried at the lower extremities of a pair of spaced swinging or tiltable arms 90 of the swinging frame 76, said arms being pivotally supported at their upper extremities by means of a shaft 92. This shaft 92 is suitably supported at opposite extremities thereof in bracket arms 94 inclining upwardly and rearwardly from the machine frame 38. The support member 74 is horizontally slidable within a portion 96 of the swinging frames 76, Figure 6, extending between the lower extremities of the arms 90 for the purpose of positioning the cutter tool 32$^a$ longitudinally of the work or cutter 30$^a$. The horizontal movement of the support member 74 is occasioned in response to the actuation of a hand wheel 98 which actuates a bevel gear 99, Figures 1 and 6, which meshes with a companion gear 100. Rotation of this gear 100 actuates a worm 102 and a worm wheel 104 meshing therewith which is mounted upon a screw 106, Figure 1. Thus in response to the rotation of this gear 104 which is carried by the screw 106, the support member 74 will be moved longitudinally of the machine and relative to the tiltable arms 90. In this manner proper axial adjustment of a tool supported within the tool post 56 may be accurately obtained.

From the foregoing it will be understood that the tool 32$^a$ may be moved in an arcuate path by exerting an upward force against the lower extremities of the arms 90. The center of this arcuate path will be at the center or axis of rotation of the shaft 92 and in this connection attention is directed to the fact that the axis of rotation of the shaft 92 simulates the center line $a$—$b$ described in connection with Figures 10 to 16 inclusive and that the arcuate movement which the tool 32$^a$ experiences in response to a swinging movement of the arms 90 corresponds to the arcuate movement of the tool 32 as hereinbefore described. The tilting or swinging of the frame 76 for the purpose of arcuately moving the tool 32$^a$ may be accomplished by employing a jack-screw 108, Figures 4 and 6, which is inclined from the vertical and is provided with a head 110 which engages the lower surface of the frame portion 96 of the swinging frame 76. By rotating a worm wheel 112 threaded upon the screw 108 in the proper direction, the head 110 will be elevated so as to cause the upward tilting or swinging of the frame 76 and rotation is imparted to the worm wheel 112 through the agency of a worm 114 meshing therewith. This worm 114 is carried by a sleeve 116, Figure 5, one extremity of the sleeve supporting a hand wheel 118 and the other end thereof supporting a clutch member 120. Extending through the sleeve 116 is a rod 122 which supports a small hand wheel 124 at one extremity thereof, the other extremity of the rod having a pin connection with a clutch member 126 which is companion to the clutch member 120. The clutch member 126 has a slidable key connection with a stub shaft 128 which is rotatable within a bearing 130 of the machine frame and supports a gear 132 which is driven through the agency of a gear 134. It will be apparent that when the clutch members 120 and 126 are engaged, rotation imparted to the gear 132 will be transmitted to the worm 114 with the result that the head 110 of the screw jack will be elevated against the swinging frame 76. By moving the small hand wheel 124 to the left, Figure 5, the clutch members 120 and 126 will be disengaged and the hand wheel 118 may then be manually operated to adjust the position of the swinging frame 76. In order to compensate for the movement of the swinging frame 76 the worm 86 which serves to actuate the reciprocating or backing-off cam 78 is provided with a universal connection or joint 136 and this universal joint 136 is connected with a similar joint 138 by means of a splined shaft 140 and a sleeve 142 which is slidable thereon to compensate for longitudinal movement of the support member 74 of the swinging frame.

I will now describe the various driving mechanisms which I employ in causing the rotation of the work, the reciprocation of the cutting tool and the tilting of the swinging frame, and it is believed that a clear understanding of these mechanisms will be had by referring specifically to the "spread-out" view of these mechanisms as disclosed in Figure 26. Power is supplied by means of a suitable electric motor 144 which is connected to a gear 146 through the medium of a clutch 148 and this clutch may be conveniently actuated by means of a crank handle 150 at the front of the machine. The gear 146 meshes with a gear 152 mounted upon a shaft 154 and this shaft 154 carries a gear 156 which is adapted to be carried selectively into engagement with either of a pair of gears 158 and 160 by means of a shifter arm 162. The gear 156 is slidably keyed upon the shaft 154 and when said gear meshes with the gear 158 the shaft 52 will be rotated in one direction and when the gear 156 meshes with the idler gear 160 which meshes with a gear 164, a reverse rotation will be imparted to the shaft 52. The shifter arm 162 is actuated by means of a crank handle 163 conveniently positioned at the front of the machine. The shaft 52 carries the worm 50 which meshes with the worm wheel 130

48 on the work spindle shaft 40 and hence it will be understood how rotation is imparted to the cutter 30ª. At one extremity of the work spindle shaft 40 is a gear 166 and this gear is connected by means of a suitable train of gears to a gear 168 which is connected to the gear 134 by means of a shaft 170. Thus it will be understood how the power is supplied to the jack-screw 108. The splined shaft 140 and companion sleeve 142 which are operatively connected to the worm drive for the backing-off cam 78 are rotated in response to the rotation of a pair of bevel gears 172 and 174 which are rotated in response to the actuation of the shaft 52, the bevel gear 174 being connected through a suitable train of gears to a gear 176 mounted upon the shaft 178. This shaft 178 is connected through the medium of a spring or clicking clutch 180 to a shaft 182 which is connected to the spline shaft 140 by means of the universal joint 138. By employing the spring or clicking clutch 180 the position of the backing-off cam 78 is not disturbed when the machine is thrown into reverse operation. From the foregoing it will be understood that forward and reverse rotation of the operating parts just described may be controlled by means of the crank handles 150 and 163.

In the operation of my improved forming and relieving apparatus the cutter 30ª is properly positioned upon the work spindle and the tool 32ª properly positioned with respect to the periphery of the cutter teeth as hereinbefore described in connection with tool 32 and the cutter 30 disclosed in Figures 11 to 16 inclusive. Although the tool 32ª is provided with a formed cutting edge as shown in Figures 9 and 17 to 19 inclusive, it is to be understood that the operating characteristics of the tool 32ª are identical with the operating characteristics of the straight edged tool 32. The crank handle 163 is manipulated to effect the rotation of the cutter in the direction indicated by the directional arrows in the various figures and simultaneously with the rotation of the cutter, the cam 78 will be actuated to reciprocate the tool 32ª in timed relation with respect to the longitudinal flutes of the cutter. Contemporaneously with the rotation of the cutter and the actuation of the backing-off cam 78, the head 110 of the jack-screw 108 will be slowly elevated, thereby causing the tool 32ª to move in an arcuate path about the axis of the shaft 92. As already pointed out, the upward arcuate movement of the cutting tool 32ª is very slow and hence many revolutions of the cutter will be made before the entire cutting edge of the tool will be swept across the peripheral surface of the cutter teeth as hereinbefore described. By having the proper arrangement of the gear train which connects the gears 166 and 168, Figure 26, the speed of revolution of the cutter 30ª may be readily controlled. In this connection attention is again directed to the fact that by reason of the spiral flutes formed within the cutter 30ª the speed of rotation of said cutter must be such that a compensating effect between the backing-off movement of the tool and the rotation of the cutter is produced so as to properly present the cutter teeth to the tool as said tool is swept across the periphery thereof. After the tool 32ª has completed the forming and relieving of the cutter teeth, said tool may be moved outwardly from the cutter by means of the hand wheel 60 and the machine thrown in reverse so as to lower the tool to its starting position. Another cutter may be placed upon the spindle and the operation as above set forth again repeated.

After the tool 32ª has completed its sweep across the peripheral surface of the cutter teeth, the aggregate profile of the cutter teeth will be curved or formed arcuately, as clearly shown in Figure 19. When the cutter is subjected to heat and a quenching bath in the tempering process the stock removed by the tool 32ª in forming the arcuate tooth profile will be sufficient to just compensate for the distorting effect of the quenching bath and the cutter will assume a true cylindrical form. Thus, as shown in Figure 21, after the tempering of the cutter the aggregate profile of the teeth thereof will have the proper or required contour, said contour conforming to the projected contour of the cutting edge of the tool 32ª.

From the foregoing description it will be seen that by presenting the tool 32ª with the cutting edge 2ᵇ thereof askew to the work axis and moving said tool along an orbit tangential to the work, said orbit will completely envelop the periphery of the work or cutter. It will also be noted that the tangential movement of the tool is coordinated with the rotation of the cutter so as to synchronize the point of tangency of the tool with the cutter teeth so that said point of tangency remains in a plane substantially parallel to the work axis and the axis of rotation of the shaft 92 which forms the nucleus of the arcuate path along which the tool travels. By employing my improved forming and relieving apparatus, helically fluted milling cutters may be formed so that the aggregate cutter profile thereof will be curved and the outer surfaces of the cutter teeth will be uniformly relieved. By uniformly relieving these teeth, said cutters may be resharpened by the ordinary methods without altering the profiles of the cutter teeth. By employing my improved apparatus a tool such as the tool 32ª may be employed having straight cutting edges similar to the ordinary formed tool and does not need to have its general outline curved or bowed in accordance with the curve which is desired to be produced in the profile of the cutter teeth. Such a tool is very simple to construct and may be sharpened by means of the usual methods without destroying the shape and contour thereof. By employing a suitable variable speed motor the speed of operation of the apparatus may be controlled in accordance with the size of the cutters which are to be formed and relieved and the described apparatus also enables the forming and relieving of the cutter teeth along the sides as well as along the periphery thereof. Thus my invention provides a very effective means for forming and relieving milling cutters and the like in the manner described so that when such cutters are subsequently tempered by subjection to heat and a quenching bath, the distortions which necessarily result will be just compensated or counter-balanced by reason of the forming and relieving to which the cutter teeth have been subjected, thereby enabling the production of hardened milling cutters with teeth having the desired cutting profile.

Having thus described my invention, what I claim as new and desire to secure by Letters Patent is:

1. In an apparatus for producing cutters and the like, a work support, a tool support, and means for causing relative movement between the work and a supported tool to present said tool to the work along an orbit tangential to the work and enveloping the work.

2. In an apparatus for producing cutters and the like, a cutter support, a tool support, means for causing relative movement between the cutter and a supported tool to present said tool to the cutter along an orbit tangential to the cutter and enveloping it, and means for producing relative bodily movement radially of the cutter to produce relief in the cutter tooth.

3. In an apparatus for producing cutters and the like, a rotary work support, means for supporting a tool with the cutter profile thereof askew to the work axis, and means for moving the tool along an orbit tangential to the work and enveloping it.

4. In an apparatus for producing cutters and the like, means for supporting a cutting tool, means for rotatably supporting work in operative relation to said tool, and means for relatively moving said tool in an arcuate tangential direction of the work, said movement being co-ordinated to synchronize the point of tangency of the tool and the work to meet in a plane substantially parallel to the work axis and the nucleus of the tangential curve followed by the tool.

5. In an apparatus for producing cutters and the like having helical gashes, a rotary work support, a cutting tool support, means for moving the tool in an arcuate tangential path with respect to the work, means for moving the tool transversely of the work, and means for coordinating the arcuate and transverse movement of the tool and the rotation of the cutter to compensate for the helical lead of the cutter gashes.

6. In apparatus for producing cutters and the like, a rotary work support, a cutting tool, and means for moving the cutting tool in an arcuate tangential path with respect to the work, the nucleus of the arcuate path of the tool being disposed on the opposite side of the work from the point of tangency of the tool and the work.

7. In an apparatus for producing cutters and the like, a rotatable spindle for supporting a cutter blank, means for supporting a cutting tool to present said tool at the front of a supported cutter blank, means for transversely moving the tool in timed relation to the rotation of the spindle, and means for effecting tangential movement of the tool in an arcuate path, said tangential movement causing the point of tangency of the tool and the work to travel axially from one end of the cutter blank to the other, thereby finishing the cutter in an axial plane.

8. In combination with means for rotatably supporting cutter blanks and the like, a pivotally mounted tool support, and means for moving the tool support to present a tool carried thereby to the work in an arcuate path tangential to the work.

9. In combination with means for rotatably supporting cutter blanks and the like, a pivotally mounted means for supporting a cutting tool with the cutting edge thereof askew to the work axis, and means for moving the tool supporting means about its pivotal point to progressively present successive portions of the cutting edge of the tool to the work.

10. In apparatus of the class described for producing cutters and the like, a rotatable work support, a tool support, and means for elevating a supported tool to present said tool to the work along an arcuate path tangential to the work, thereby causing the cutting edge of the tool to be swept across the periphery of the work.

11. In an apparatus of the class described for producing cutters and the like, means for supporting a cutting tool, means for rotatably supporting work in operative association with said tool, means for moving said tool in an arcuate tangential direction of the work, means for moving the tool transversely of the work in timed relation with respect to the rotation thereof, and means for adjustably varying the direction of said transverse movement with respect to the axis of the work.

12. In an apparatus for producing cutters and the like, means for rotatably supporting work, a swinging frame, means for securing a cutting tool on said frame in operative association with the work, and means for slowly elevating the swinging frame about its axis to move the tool supported thereby in a path tangential with respect to the work.

13. In an apparatus for producing cutters and the like, a rotary work support, a swinging frame including a cutting tool support which is longitudinally adjustable with respect to the axis of the work support, and means for moving the swinging frame about its axis to present the cutting tool to the work in a direction tangential of the work.

14. In apparatus of the class described for forming and relieving milling cutters and the like, a rotary cutter support, a pivotally mounted tool supporting means for presenting the tool to the front portion of a supported cutter and tangentially thereof, the pivotal point of said tool supporting means being disposed in back of the cutter, and means for moving the tool support about its pivotal point.

15. In an apparatus for producing milling cutters and the like, a rotary spindle for supporting helically gashed cutters, means for supporting a cutting tool with the cutting edge thereof askew to the cutter axis, said tool support being pivoted and adapted when moved to present a supported tool to a supported milling cutter in a direction tangential of the periphery of the cutter teeth, the pivotal point of the tool support being in substantially the same plane as the point of tangency of the tool and the work and also the work axis, and means for moving the tool transversely of the work in timed relation with the rotation thereof to relieve the cutter teeth.

16. In a relieving machine of the class described, a machine frame, a work supporting spindle mounted in the frame, a tool support pivotally mounted upon the frame, the pivotal axis of said support arranged in parallelism with the axis of the work spindle and spaced therefrom, said support being designed to tangentially present a cutting tool to the work, means for moving the tool support about its axis, and means for reciprocating a supported tool in timed relation with respect to the rotation of work carried by the spindle.

17. In a relieving machine of the class described, a machine frame, a rotary spindle mounted within the frame for supporting work, a swinging frame mounted upon the machine frame, a tool holding means carried by the swinging frame, means for moving the swinging frame to move a supported tool tangentially with respect to the work, means for reciprocating the tool holder in time relation with the rotation of the spindle, and means for angularly adjusing the position of the tool holder with respect to the swinging frame upon which it is mounted to vary the direction of the transverse movement of the tool.

18. In a machine for relieving teeth of a helically gashed cutter blank, a machine frame, a work supporting spindle mounted thereon, a swinging frame mounted upon the machine frame, a tool holder adjustably mounted upon the swinging frame, a jack screw for moving the swinging frame so as to present a tool supported by the holder to the work in an arcuate, tangential path, means for reciprocating a supported tool to relieve teeth in the cutter blank, and common means for causing the rotation of the spindle, the actuation of the jack screw and the operation of the tool reciprocating means in timed relation.

In witness whereof, I have hereunto subscribed my name.

CARL G. OLSON.